R. A. McCLURE, H. R. STEVENS AND W. W. BOULTON.
TRUCK FOR ELEVATED RAILWAYS.
APPLICATION FILED FEB. 20, 1917.
1,317,377.
Patented Sept. 30, 1919.
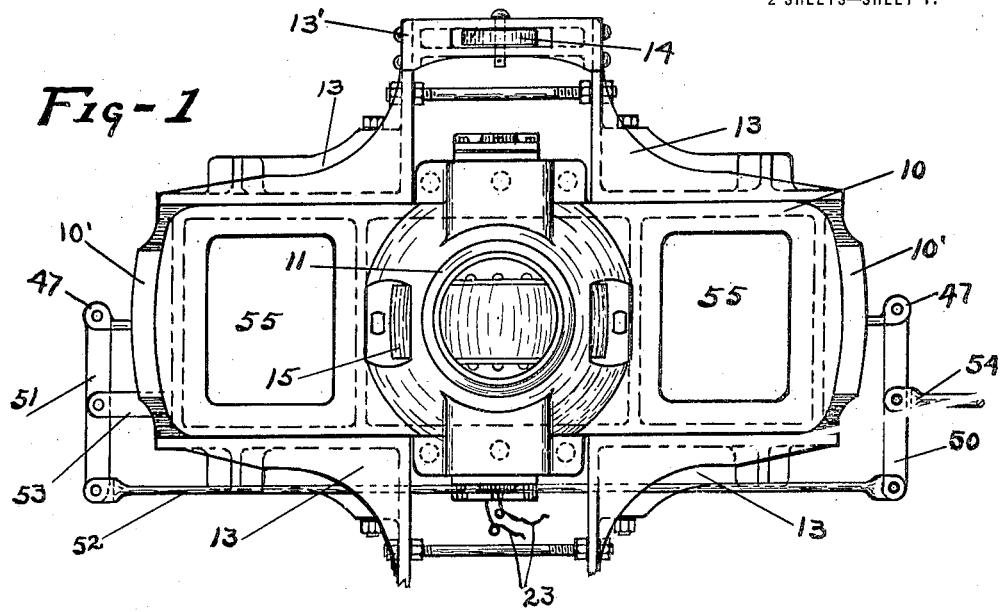
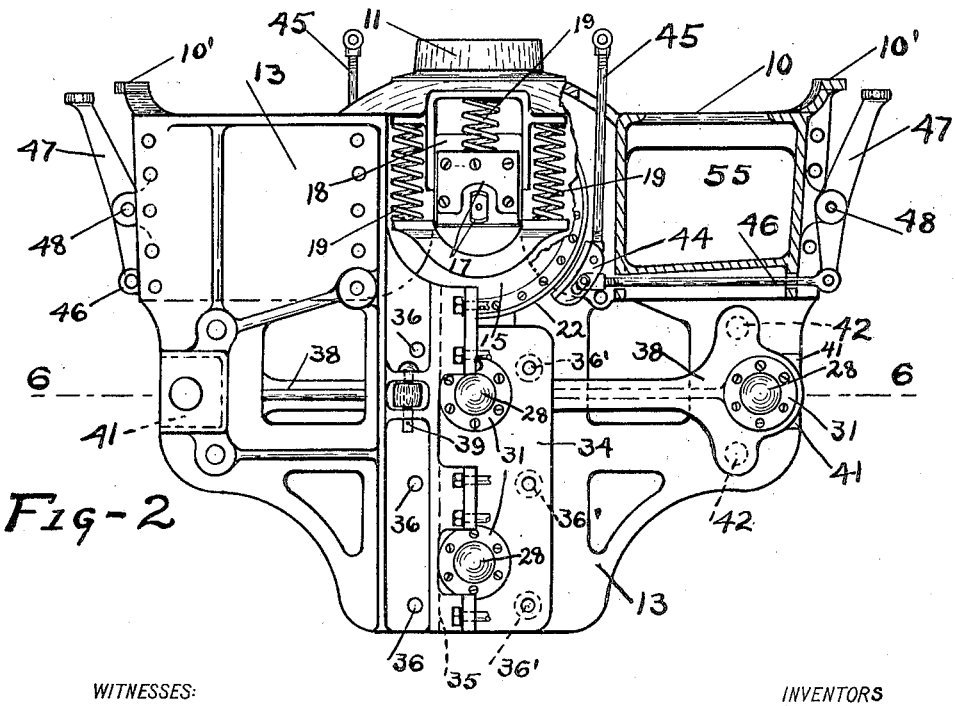
WITNESSES:
INVENTORS
ROYAL A. McCLURE
HENRY R. STEVENS
WILLIAM W. BOULTON
BY
Cook & Matheny
ATTORNEYS

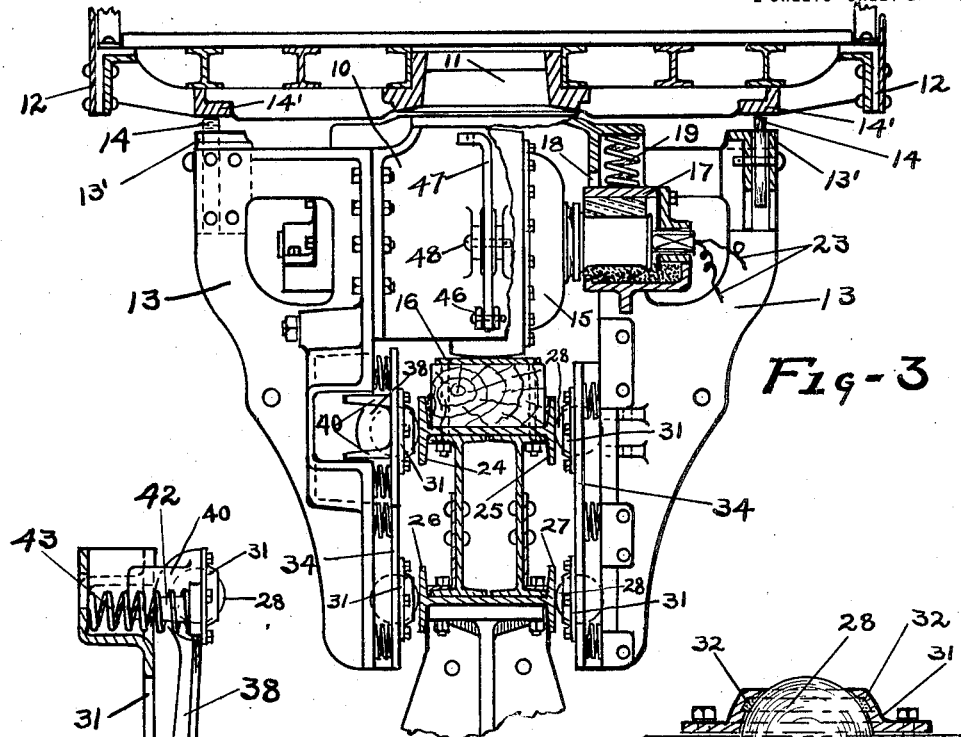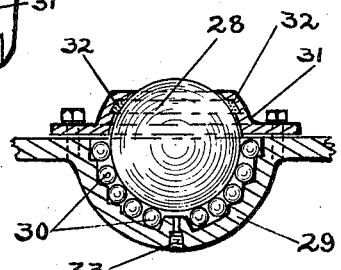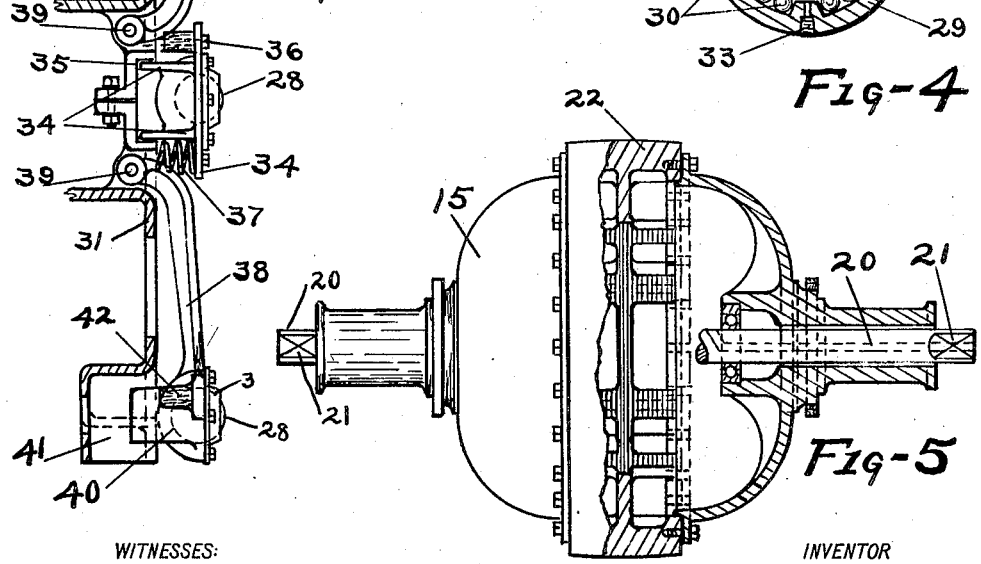

UNITED STATES PATENT OFFICE.

ROYAL A. McCLURE, HENRY R. STEVENS, AND WILLIAM W. BOULTON, OF SEATTLE, WASHINGTON, ASSIGNORS, BY MESNE ASSIGNMENTS, TO UNIVERSAL ELEVATED RAILWAY COMPANY, INCORPORATED, OF SEATTLE, WASHINGTON.

TRUCK FOR ELEVATED RAILWAYS.

1,317,377. Specification of Letters Patent. Patented Sept. 30, 1919.

Application filed February 20, 1917. Serial No. 149,966.

*To all whom it may concern:*

Be it known that we, ROYAL A. McCLURE, HENRY R. STEVENS, and WILLIAM W. BOULTON, citizens of the United States, residing at Seattle, in the county of King and State of Washington, have invented a new and useful Improvement in Trucks for Elevated Railways, of which the following is a specification.

This invention relates to improvements in railway car trucks of the type that are adapted to travel on single rail track structures having a top tread rail and laterally disposed guide rails and the object of this improvement is to provide a car truck of strong durable and compact construction that is not easy to derail, that is economical in its consumption of power and that will run smoothly and easily around curves in the track.

A further object is to provide a truck of this class having the motor that is disposed directly within the main driving wheel of the truck.

Other novel features reside in the construction and disposition of the ball bearings that engage with the guide rails of the track and hold the truck in an upright position and in the peculiar construction of the truck frame and provision of a central pivot by which such frame is connected with a car frame.

In the construction and design of a truck of this class it is necessary to provide a rigid arched frame having somewhat the shape of an inverted letter U and to construct special rail and switch mechanism to be used in connection with the truck.

This truck is especially designed for use on the track and in combination with the switch mechanism disclosed in the co-pending application filed February 20, 1917, Serial No. 149,969, of Royal A. McClure, Carl H. Reeves and William W. Boulton, for improvements in "Elevated railroad tracks" and improvements in "Railroad track switches".

The invention consists in the novel construction, adaptation and combination of parts of a railroad truck and track therefor as will be more clearly described in the following specification, illustrated in the accompanying drawings and finally pointed out in the appended claims.

In the accompanying drawings Figure 1 is a plan view of a truck constructed in accordance with this invention certain portions being broken away; Fig. 2 is a view in side elevation of the same showing certain portions broken away; Fig. 3 is a view in end elevation of the same showing parts thereof in cross section; Fig. 4 is an enlarged sectional view of a ball bearing embodied in the invention; Fig. 5 is an enlarged view partly in section and partly in elevation of a motor wheel and Fig. 6 is a fragmentary view partly in section and partly in elevation substantially on broken line 6, 6 of Fig. 2 illustrating the disposition of the roller bearings for holding the truck in an upright position.

Referring to the several views throughout which like reference numerals indicate like parts the numeral 10 indicates the top member of a truck frame having a centrally disposed upwardly directed circular member 11 that forms a pivot upon which a car body 12 may rest and 13 are extensions or side members preferably four in number that are bolted to the frame and to each other and form an inverted U-shaped structure that is adapted to straddle a rail.

The outer portions of the members 13 are secured together by plates 13' having rollers 14 mounted therein that engage with tracks 14' on the bottom of the car body 12 and prevent the body from tilting sidewise.

The forward and rear end of each truck frame is provided with an upward extention 10' that engages with a suitable plate (not shown) on the bottom of the car body and co-acts with the pivot 11 to prevent the truck from tilting forward or backward.

When the car body is resting squarely on the truck frame the extensions 10' and the rollers 14 are slightly below the car body so that they do not support any of the weight of the car body except when relative tilting movement between the truck frame and the car body occurs.

In use one of the trucks herein described is placed at each end of a car frame, the car frame serving to hold the trucks from tilting backward or forward.

The truck is supported for movement on a motor wheel or drive wheel 15, see Fig. 5, that runs upon the main rail or tread 16 of a track of a form more specifically described in the co-pending application hereinbefore referred to, such wheels being journaled in boxings 17 that are disposed in guides 18 in the truck frame which permit the boxings to move vertically, the weight of the truck frame being resiliently supported upon the boxings 17 by helical compression springs 19 as more clearly shown in the broken away portions of Figs. 2 and 3.

The motor wheel is preferably constructed with a rotating field that forms part of the wheel itself and with a stationary armature that is secured to a shaft 20 having flattened end portions 21 that project through slots in the ends of the boxings 17 and prevent the shaft and armature from turning the slots being long enough to afford the shaft 20 a vertical adjustment and prevent weight from being sustained by said shaft when the boxings 17 have become worn.

The tread portion of the wheel is preferably rounded as at 22 so that it will normally bear upon the rail tread 16 for a narrow portion of its width only thereby reducing the resistance to movement between the wheel and the track to a minimum and increasing the efficiency of the wheel.

23 are electric circuit wires that extend from the armature of the motor wheel outwardly through the shaft 20 and may connect with suitable trolley mechanism so that electrical current will be supplied to the motor.

The rail structure is provided with four guide rails 24, 25, 26 and 27 that are disposed in vertical planes, two on each side of the rail structure at the top and bottom thereof respectively and serve as tracks upon which bearing balls 28 that are connected with the truck frame may roll.

The balls 28 are each disposed in bearing sockets 29 see Fig. 4 that are formed with suitable races for small balls 30 upon which the larger balls 28 roll.

The balls 28 protrude slightly less than half of their diameter from the open side of the sockets 29 and are secured within such sockets by collar members 31 that fit over the protruding portions of the balls 28 and are internally provided with packing rings 32 that rest lightly against the balls and serve to exclude the dust and dirt from the bearings.

It will be seen from the detail shown in Fig. 4 that when the exposed portion of the ball 28 receives a thrust from any angle from which it is possible to strike such ball the thrust will be sustained directly by the small balls 30 and the larger ball 28 will roll freely on the smaller balls 30.

33 is a grease or oil inlet that is provided in the bottom of each bearing socket 29.

The truck is provided on each side with four of these ball bearings above described two of such bearings being located midway between the two ends of the truck and being adapted to run on the top and bottom guide rails respectively and the other two bearings being located one near each end of the truck frame and being adapted to engage the upper guide rails 24 and 25.

The two centrally disposed bearing sockets 29 on each side of the truck frame are formed integral with plates 34 having rearward extensions 34' that are adapted to fit within guides 35 in the truck frame in such manner that the entire plates are guided for movement toward and away from the guide rails.

The plates 34 are secured to the truck frame by bolts 36 that pass through lugs 36' over which are placed helical compression springs 37.

The lugs 36' limit the movement of the plates toward the truck frame and the bolts 36 limit the movement of the plates away from the truck frame.

The plates 34 are easy to remove in case it is desired to have access to the bearings.

38 are arms, two on each side of the truck frame, and extending forwardly and rearwardly thereof such arms each being articulated at one end by pivots 39 with the truck frame and each being provided on its outer end with a bearing socket 29 of a form already described whereby bearings are provided at the front and rear ends of the truck for engagement with the guide rails.

The sockets 29 on the outer ends of the arms 38 each have rearwardly directed guide members 40 that fit within guideways 41 in the frame to guide and support the bearings on the ends of the arms and such arms are provided on each side of the guide members 40 with studs 42 over which are placed helical compression springs 43 that fit within suitable recesses in the frame and hold the ends of the arms 38 outwardly so that the balls 28 will run on the guide rails 24 and 25 and co-act with each other in guiding the truck around a curve.

The motor wheel is adapted to be engaged on each side adjacent the track by brake shoes 44 that are swingingly supported by members 45 and are adapted to be moved into and out of contact with the wheel by brake rods 46 connected with the lower ends of lever arms 47 that are fulcrumed as at 48.

The top ends of the lever arms 47 at each end of the truck are connected with the inner ends of equalizer links 50 and 51 respectively, see Fig. 1. The outer ends of the links 50 and 51 are connected with each other by link 52 and the link 51 is medially pivoted to a bracket 53 that is rigid with the frame.

The link 50 is pivotally connected at a medial point to a brake operating rod 54 that may extend to a pneumatic cylinder (not shown) located beneath the body of the car.

When a pull is exerted on the brake operating rod 54 the brake shoes on both sides of the motor wheel will be moved into contact with the wheel in an obvious manner and will exert an equal brake pressure on both sides of the wheel.

The brake rods 54 are adapted to be connected with standard air brake equipment.

The frame member 10 is recessed on each side of the truck wheel 15 to provide sand boxes 55 that may have suitable discharge means (not shown) through which sand may be discharged onto the track.

The motor in each drive wheel enables the power to be applied to the truck at each end of the car.

The peculiar arched frame structure fitting over or straddling the single track rail constitutes an important feature of the invention, the two sides.

It is obvious that changes in the form of construction of the various parts of this device may be made within the scope of the following claims.

What we claim and desire to protect by Letters Patent is:

1. The combination with an elevated rail structure having a tread rail on the top and guide rails on the sides thereof, of a truck frame adapted to straddle said rail, a motor driven truck wheel journaled in the center of said frame resilient means interposed between said truck wheel journals and said frame, ball bearings disposed to engage the side rails of said track, guides in said frame for supporting said bearings for movement toward and away from said track and resilient means interposed between said bearings and said frame.

2. The combination with a rail structure having a tread rail surface on the top thereof and guide rail surfaces on the sides thereof, of a truck frame having two sides adapted to project downwardly on opposite sides of said rail, a central pivot on the top of said truck frame for supporting one end of a car body, a wheel mounted in the center of said truck frame and adapted to run on the tread of said rail, a motor within said wheel, ball bearings supported in guides in said frame and adapted to engage said guide rail surfaces, springs interposed between said frame and said bearings and means for limiting the movement of said bearings toward and away from said track.

3. The combination with a track, of a truck frame, a single truck wheel supporting said frame on said track, ball bearings disposed on each side of said truck wheel to engage the opposite sides of said track and other ball bearings disposed near the front and rear ends of said truck frame to engage the opposite sides of said track.

4. The combination with an elevated one rail track, of a truck frame disposed to straddle said track, a single truck wheel disposed in the center of said truck frame and adapted to support said truck frame for movement over said track, bearings disposed on each side of said truck wheel to yieldingly engage the sides of said track, arms pivoted to said truck frame adjacent said bearings and extending forwardly and rearwardly of said truck frame and bearings in the outer ends of said arms to engage said track and guide said truck frame.

5. The combination with an elevated one rail track, of a truck frame adapted to straddle said track, a central pivot on said truck frame to connect said truck frame with a car body, a single truck wheel disposed in the center of said truck frame and adapted to run on said rail, brakes associated with said truck wheel, ball bearings disposed in guideways in said frame midway between the two ends thereof, springs interposed between said truck frame and said bearings, means for limiting the movement of said bearings in said guideways, arms pivoted to said truck frame on each side of said track and extending forwardly and rearwardly thereof, ball bearings in the ends of each of said arms and adapted to engage said rail and springs interposed between said arms and said truck frame.

6. The combination with a rail structure having a tread rail on its top and an upper and a lower guide rail disposed on each side thereof, of an arched truck frame adapted to straddle said rail structure, a truck wheel to support said frame, guideways in the side portions of said frame, plates resiliently supported in said guideways and bearings carried by each of said plates to engage with said upper and lower guide rails.

7. The combination with a rail structure having a tread rail on the top and guide rails on the sides thereof, of an arched truck frame adapted to straddle said rail structure, guideways in said truck frame opposite the sides of said track, plates resiliently mounted in said guideways and adapted for limited movement toward and away from said truck frame, ball bearings carried by the top and bottom portions of said plates and adapted to engage said guide rails, arms pivotally secured to said truck frame adjacent said guideways and adapted to project forwardly and rearwardly, and ball bearings in the outer ends of said arms to engage said guide rails and guide said truck.

8. The combination with a one rail truck structure having guide rails on the sides thereof, of an arched truck frame, a truck wheel to support said truck frame on said track and ball bearings secured to said frame to engage said guide rails, each of said ball bearings comprising a socket having a plurality of smaller balls disposed therein, a larger ball adapted to rest against said smaller balls, a collar to secure said larger ball in said socket and a packing ring in said collar to prevent the entrance of dirt into said bearing.

Signed by us at Seattle, Washington, this 10th day of February, 1917.

ROYAL A. McCLURE.
HENRY R. STEVENS.
WILLIAM W. BOULTON.

Witnesses:
R. E. HILBERT,
SIGRID GREGERSEN.

Copies of this patent may be obtained for five cents each, by addressing the "Commissioner of Patents, Washington, D. C."